(12) United States Patent
Corso

(10) Patent No.: US 9,322,601 B2
(45) Date of Patent: Apr. 26, 2016

(54) OPTICAL FIBER COOLING DEVICE

(75) Inventor: Francois Corso, St-Martin-de-Bavel (FR)

(73) Assignee: Conductix Wampfler France (FR)

( * ) Notice: Subject to any disclaimer, the term of this patent is extended or adjusted under 35 U.S.C. 154(b) by 0 days.

(21) Appl. No.: 13/825,000

(22) PCT Filed: Nov. 8, 2011

(86) PCT No.: PCT/EP2011/069585
§ 371 (c)(1),
(2), (4) Date: Jul. 9, 2013

(87) PCT Pub. No.: WO2012/062720
PCT Pub. Date: May 18, 2012

(65) Prior Publication Data
US 2013/0277014 A1    Oct. 24, 2013

(30) Foreign Application Priority Data
Nov. 8, 2010  (FR) ...................................... 10 59213

(51) Int. Cl.
*B23P 15/26*      (2006.01)
*F28F 1/00*       (2006.01)
*C03B 37/027*     (2006.01)

(52) U.S. Cl.
CPC . *F28F 1/00* (2013.01); *B23P 15/26* (2013.01); *C03B 37/02718* (2013.01); *Y10T 29/4935* (2015.01)

(58) Field of Classification Search
CPC ...................... C03B 2205/55; C03B 37/02718
See application file for complete search history.

(56) References Cited

U.S. PATENT DOCUMENTS

| 4,664,689 A | * | 5/1987 | Davis ............................... 65/434 |
| 5,314,515 A |   | 5/1994 | Cain |
| 5,418,881 A |   | 5/1995 | Hart, Jr. et al. |
| 6,715,323 B1 |  | 4/2004 | Roba |
| 7,153,115 B2 | * | 12/2006 | Leon et al. .................... 425/72.2 |
| 2011/0094717 A1 | * | 4/2011 | Cummings et al. ........... 165/155 |

FOREIGN PATENT DOCUMENTS

| DE | 4412563 | 10/1995 |
| EP | 1382581 | 1/2004 |
| JP | 10101360 | 5/1994 |

OTHER PUBLICATIONS

Rapport De Recherche Preliminaire; May 27, 2011; 6 pages.
Traite De Cooperation en Matiere De Brevets; Feb. 3, 2012, 11 pages.

* cited by examiner

*Primary Examiner* — Queenie Dehghan
(74) *Attorney, Agent, or Firm* — Ryan T. Grace; Advent, LLP

(57) ABSTRACT

The invention relates to a device (1, 1', 1") for cooling an optical fiber (13), including two portions (20, 29), each of the portions (20, 29) including at least one receiving surface (204, 294) on which a half-channel (240, 2490) is provided, such that, once the two portions (20, 29) are placed in contact at the receiving surface (204, 294) thereof, the two portions (20, 29) form a main through-channel for accommodating the passage of the optical fiber (13), characterized in that each of the portions (20, 29) is a block of a thermally conductive material and in that at least one (20) of the portions includes a cylindrical secondary channel (209), which is in fluid connection with a plurality of openings (2046) distributed along the half-channel (2040) of said portion (20), in order to form a heat-transfer fluid distribution chamber for the plurality of openings (2046).

12 Claims, 6 Drawing Sheets

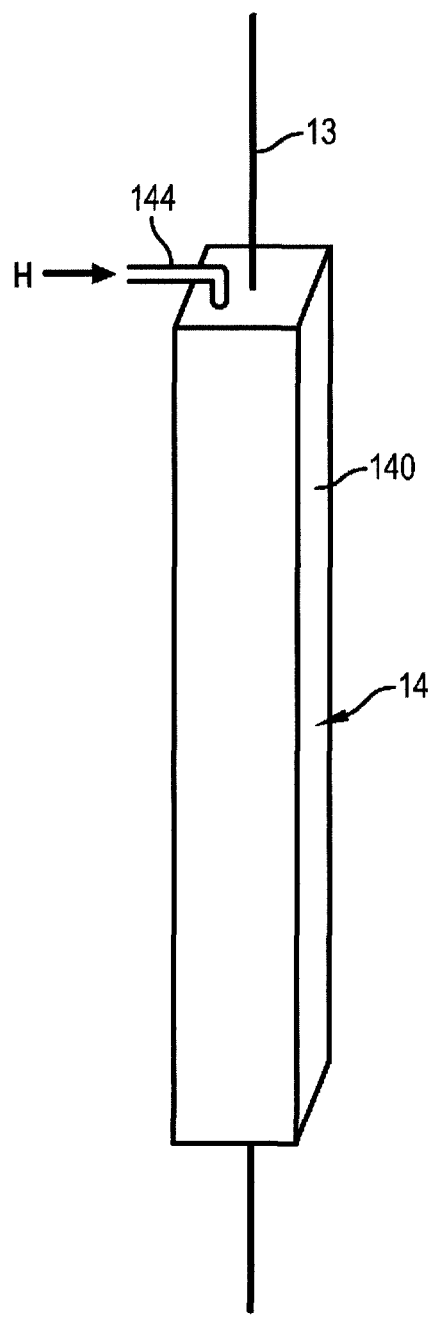

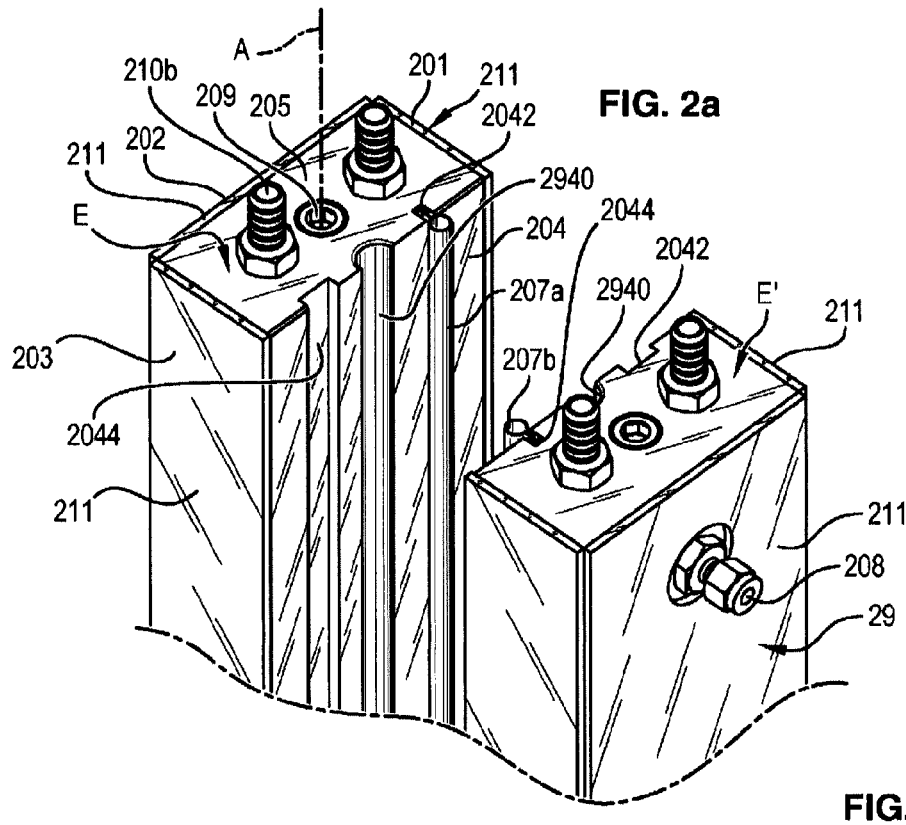
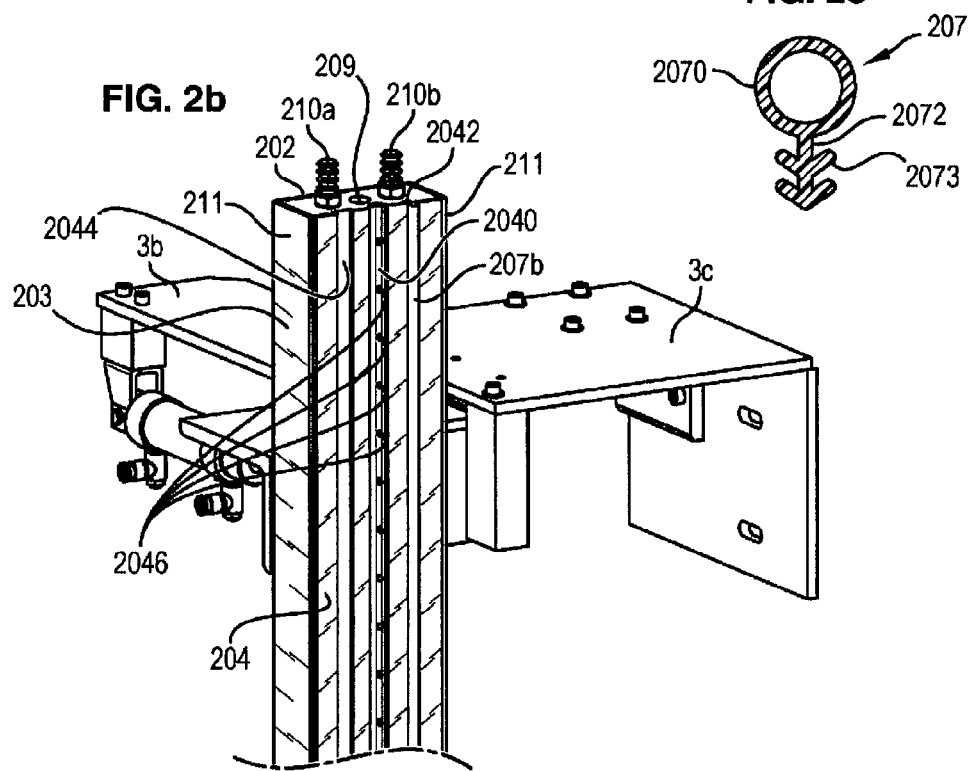

OPTICAL FIBER COOLING DEVICE

The invention relates to devices for fabricating optical fibers. More particularly, the invention concerns optical fiber cooling devices used in a method for fabricating said optical fiber.

With reference to FIG. 1 (taken from document U.S. Pat. No. 5,418,881) a known method for making optical fiber in the prior art comprises a furnace 12 in which glass is heated, preferably as a preform (glass rod). The furnace is generally located at a height, preferably at the top of a tower T having a height generally reaching 20 to 35 meters.

The furnace 12 comprises an outlet opening 120 located in the lower part of the furnace facing the bottom of the tower. From this opening 120 there emerges a partly molten glass cane 13 (i.e. whose rheology allows casting from this opening). This cane then forms the optical fiber properly so-called.

Underneath the furnace 12 there is a cooling zone 142 through which the optical fiber is cooled. Preferably, the cooling zone 142 more particularly comprises a cooling device 14 through which the optical fiber 13 is cooled. Said device is described in more detail in the remainder hereof.

Once the optical fiber 13 is cooled, it continues travelling downwards into subsequent processing stations 15, 16, 17, 18 for operations such as cladding for example. Finally, the optical fiber 13 is generally spooled for transport and subsequent use of the fiber.

With reference to FIG. 1b, a cooling device known in the prior art comprises a hermetic cooling unit 140 in which the optical fiber 13 leaving the furnace is circulated for cooling. A cooling liquid is injected into the unit. This liquid is preferably cold helium used to cool the fiber without causing deterioration thereof (contrary to the injection of water which would deteriorate the fiber).

The helium is injected via an inlet 144 located at the top part of the cooling unit i.e. close to the inlet for the fiber 13 into the cooling unit 140. The helium comes into contact with the fiber 13 for cooling thereof and leaves the unit driven by the fiber 13.

However, criticisms have been leveled against this cooling device in that the temperature of the helium increases rapidly when in contact with the fiber (whose temperature on leaving the furnace may reach 1000° C.); as a result cooling of the fiber 13 is only effective over a portion of the cooling unit 140.

Water is sometimes used to cool the actual cooling unit 140. However the criticism here is that water may leak from the cooling unit.

It is therefore one objective of the invention to provide a cooling device, in particular for optical fibers, with which it is possible to obtain a substantial increase in the heat exchange between the fiber travelling through the device and the cooling liquid used.

Another objective of the invention is to provide a cooling device, in particular for optical fibers, with which it is possible to achieve maximize savings on the use of helium. Helium is effectively an expensive gas and it is sought to make maximum use thereof for its cooling effect on optical fibers.

A further objective of the invention is to provide a cooling device which avoids any problem of water leakage.

For this purpose, the invention concerns a cooling device for optical fibers comprising a main through-channel intended to allow the passing of an optical fiber, characterized in that the main channel comprises a plurality of openings distributed along the main channel, the device further comprising a distribution chamber for a heat-exchange fluid in fluid connection with the plurality of openings.

Preferably, the optical fiber cooling device comprises two portions, each of the portions including at least one receiving surface on which a half-channel is arranged such that once the two portions are placed in contact at their receiving surfaces, the two portions form a main through-channel for accommodating the passage of the optical fiber, characterized in that each of the portions is a block of heat-conductive material and in that at least one of the portions comprises a cylindrical secondary channel in fluid connection with a plurality of openings distributed along the half-channel of this portion to form a heat-exchange fluid distributing chamber for the plurality of openings.

Advantageously, but optionally, the invention comprises at least one of the following characteristics:
  the device comprises a secondary channel forming said distribution chamber, the secondary channel being connected to the main channel via a plurality of passages, each connected to an opening of the main channel;
  the ratio between the diameter of the secondary channel and the diameter of the plurality of openings is chosen so that the secondary channel forms a distribution chamber allowing the heat-exchange fluid to be injected in parallel into all the openings;
  the ratio between the diameter of the secondary channel and the diameter of the plurality of openings is between 3 and 300;
  the device comprises an inlet for heat-exchange fluid in fluid connection with the secondary channel;
  the device is made in heat-conductive material preferably comprising aluminum;
  the device further comprises a cooling duct of the device;
  the openings are spaced apart by a distance ranging from 5 mm to 200 mm;
  the device comprises at least one seal allowing the hermetic sealing of the perimeter of the main channel;
  the main channel is coated with a radiation absorption layer;
  the block forming the other of the portions also comprises a secondary channel and cooling ducts that are symmetrical relative to the plane of contact of the receiving surfaces.

The invention also concerns a tower for manufacturing optical fiber, characterized in that it comprises at least one cooling device of the invention.

The invention further concerns a method for manufacturing a cooling device according to the invention, characterized in that it comprises the following steps:
  a) providing a first block of heat-conductive material, the first block comprising at least one receiving surface;
  b) forming a main half channel on the planar surface of the first block;
  c) forming a secondary, preferably cylindrical, channel in the first block;
  d) forming a plurality of passages between the secondary channel and the main half channel of the first block;
  e) forming at least one inlet for the secondary channel;
  f) providing a second block and performing at least step b) on the first block;
  g) contacting the two blocks via their receiving surface, so that the two half-channels form a main channel of the two assembled blocks.

Advantageously, but optionally, the method comprises at least one of the following steps:
  forming steps b) to e) on the second block;
  piercing (706) two cooling ducts (201a, 210b) in the first block (E) and/or in the second block (E').

Advantageously, the secondary channel is bored in the block, which makes it possible to have a smooth inner surface promoting the set-up of a turbulent flow.

Further advantageously, the method also comprises a black anodizing step to form a radiation absorption layer.

Other characteristics, objectives and advantages of the present invention will become apparent on reading the following detailed description of a non-limiting example of embodiment given with reference to the appended Figures in which:

FIG. 1b is a schematic illustration of an optical fiber cooling device known in the prior art;

FIGS. 2a and 2b are cavalier projections of an optical fiber cooling device according to one embodiment of the present invention;

FIG. 2c is a cross-section of a seal of an optical fiber cooling device according to one embodiment of the invention;

Figure 1A:
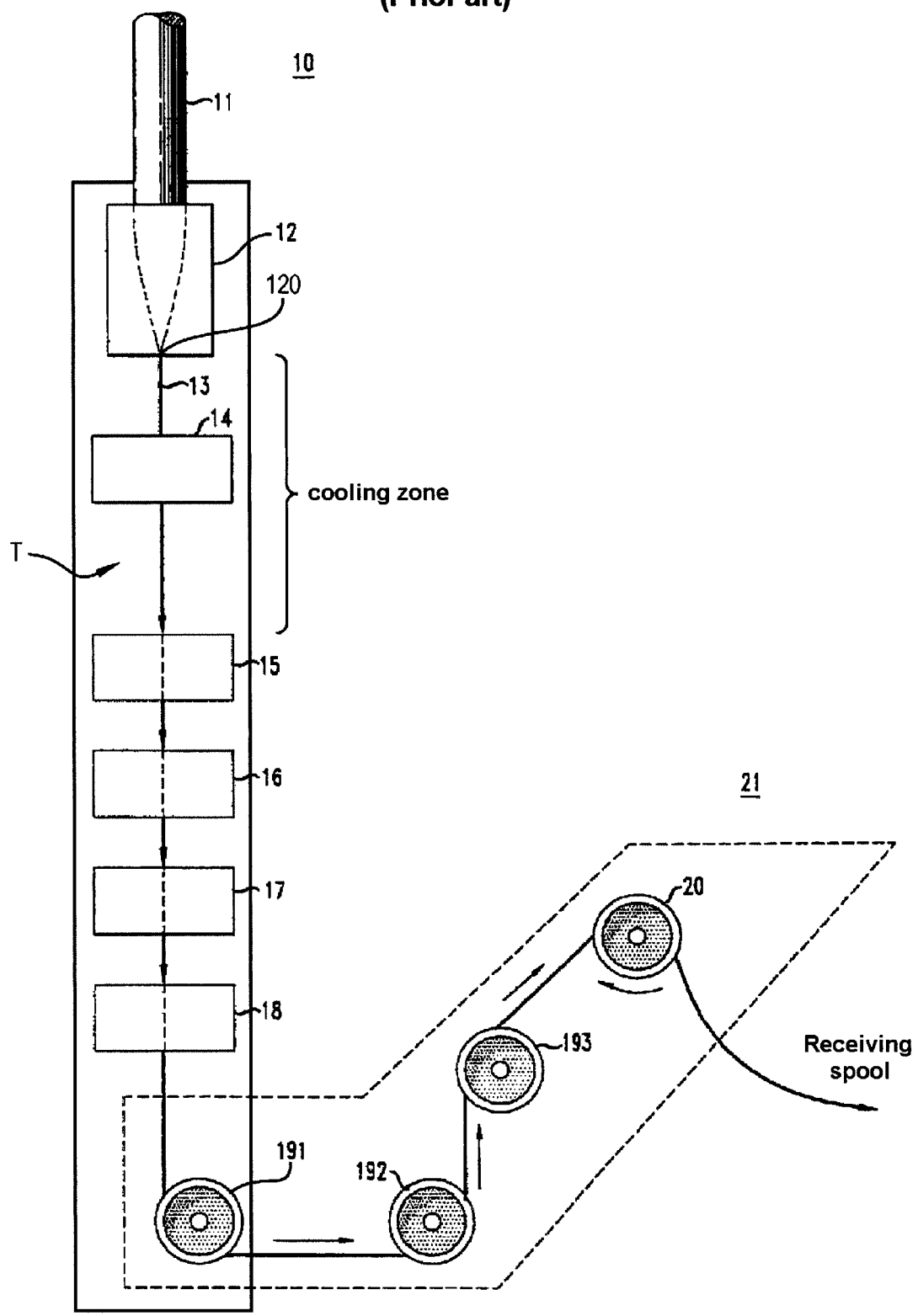
FIG. 1a is a schematic illustration of a tower for fabricating optical fiber according to the prior art.
Figure 3:
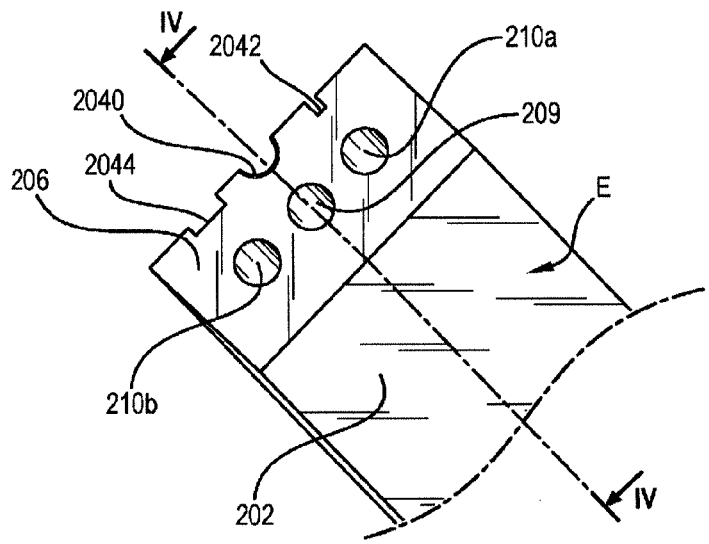
FIG. 3 illustrates part of an optical cooling device according to one embodiment of the present invention.

With reference to FIGS. 2a and 2b, a cooling device 2, in particular for optical fiber, according to one particular embodiment of the present invention comprises a fiber-receiving element composed of two portions 20 and 29, globally symmetrical relative to a plane and facing one another.

One half-portion 20, according to the present embodiment, is formed from a block E of heat-conductive material, preferably 7075 aluminum (known under the trade names "Zicral", "Ergal" and "Fortal Constructal").

This block E is preferably of rectangular parallelepiped shape having a main axis A. Block E comprises four longitudinal surfaces along axis A: 201, 202, 203 and 204 delimited by two surfaces 205 and 206 that are perpendicular to axis A. The length of block E (along axis A) is preferably, but not limited thereto, between 2600 and 3000 mm.

The surface 204 is more particularly intended to receive the optical fiber. In this respect, the surface 204 comprises a main groove 2040 in the form of a semi-cylinder of circular cross-section. This main half-channel 2040 is located parallel to the main axis A and preferably in the middle of the surface 204 of block E.

The portion 29 comprising a block E' is symmetrical with block E relative to a plane parallel to the surface 204 so that the fiber receiving surfaces (204 of portion 20 and 294 of portion 29) lie opposite one another. The receiving surface 294 also comprises a longitudinal main half-channel 2940, symmetrical with the half-channel 2040, so that the contacting of the two receiving surfaces 204 and 294 allows the defining of a passage in the form of a cylindrical main channel C of circular cross-section parallel to axis A and positioned in the center of the cooling device 2, the passage being formed by the two main half-channels 2040 and 2940. This main channel is intended for the circulation of the optical fiber so that it can be cooled therein. Therefore the diameter of the main channel must be larger than the diameter of the optical fiber, preferably from 5 mm to 20 mm (compared with a diameter of 125 µm for an optical fiber).

The fiber receiving surface 204 also comprises two secondary longitudinal grooves 2042 and 2044 positioned on either side of the main half-channel 2040 and parallel thereto. These secondary grooves 2042 and 2044, similar to their symmetrical opposites on the receiving surface 294, are intended to receive seals 207a and 207b so that once the receiving surfaces 204 and 294 are contacted, a hermetic closure is formed between the periphery of the main channel C and the outside of the cooling device at the surfaces 201, 202 and 203 (and their symmetrical match on the half portion 29). Evidently, since the main channel is a through channel, this hermetic closure does not concern the surfaces 205 and 206 (and their symmetrical match of the half portion 29) since the inlet and outlet of the main channel C are located on these surfaces.

With reference to FIG. 2c, the seal 207a (just like seal 207b) comprises a cylindrical part 2070 of circular cross-section having a longitudinal protuberance 2072 whose main axis is parallel to the main axis of the cylindrical part 2070 and extends perpendicular to the outer surface of the cylindrical part 2070. This protuberance 2072 is preferably in the form of a rectangular plate of which one of the long sides is in contact with the cylindrical part 2070 and comprises a plurality of fins 2073 on the two opposite surfaces of the protuberance 2072.

With reference again to FIGS. 2a and 2b, the seal 207a is inserted at its protuberance 2072 in the secondary groove 2042 of narrow width (preferably 3.8 mm) and whose depth (preferably 8 mm) is greater than the height of the protuberance 2072 (preferably 6 mm). The fins 2073 of the protuberance 2072, in contact with the walls of the secondary groove 2042, allow the seal 207a to be held in position in the groove 2042. The secondary groove 2942 of the receiving surface 294 of the half portion 29, opposite the groove 2042, is preferably shallower than the corresponding groove 2042 but of larger width. The groove 2942 has the shape of the secondary groove 2044 in the surface 204 of the half portion 20. Therefore, the cylindrical part 2070 of the seal 207a projecting beyond the groove 2042 is compressed in the groove 2942 when the surfaces 204 and 294 are placed in contact. On being compressed, the cylindrical part 2070 of the seal 207a tends to follow the contour shape of the groove 2942 thereby forming a hermetic seal against the outside as previously explained. Preferably, the secondary grooves 2044 and 2944 (respectively belonging to the receiving surfaces 204 and 294 and lying facing one another) are the reverse match of the grooves 2042 and 2942 so that the seal 207b is inserted in the groove 2944 at its protruding part 2072 and its cylindrical part 2070 is compressed against the secondary groove 2044 of the receiving surface 204. The symmetry between the blocks E and E' relative to the plane of contact between the receiving surfaces 204 and 294 does not therefore concern the shape of the secondary grooves facing one another.

Preferably, the surfaces 201, 202 and 203 (and their symmetric match in the half portion 29) are coated with an insulating layer 211. This insulator prevents condensation on the outer surfaces of the device which may generate water droplets. It is generally desirable to avoid the generation of these water droplets since these droplets may cause deterioration of any equipment on which they may fall or in the event of contact with the optical fiber.

Also preferably, the half-channels of the receiving surfaces 204 and 294 are coated with a radiation absorption layer 2041 allowing absorption of the radiation emitted by the fiber on leaving the furnace, for example by black anodization. By absorbing the radiation without reflecting it back onto the fiber, cooling of the fiber is improved.

The use of aluminum blocks to form the device is particularly advantageous since this allows the black anodizing to be performed in simple manner e.g. by immersing these blocks in suitable electrolytic baths.

According to one chief characteristic of the present invention, the main half-channel 2040 of the cooling device comprises a plurality of openings 2046 distributed along the half-channel 2040. The cooling device further comprises an inlet 208 for a heat-exchange fluid, in fluid connection with the plurality of openings 2046.

Preferably, the openings 2046 are spaced apart by a distance ranging from 5 mm to 200 mm. The openings 2046 have a diameter ranging from 0.2 mm to 2 mm. Provision is particularly made so that the openings are spaced apart by the same spacing, or on the contrary so that the spacing between the openings is variable.

Figure 4:
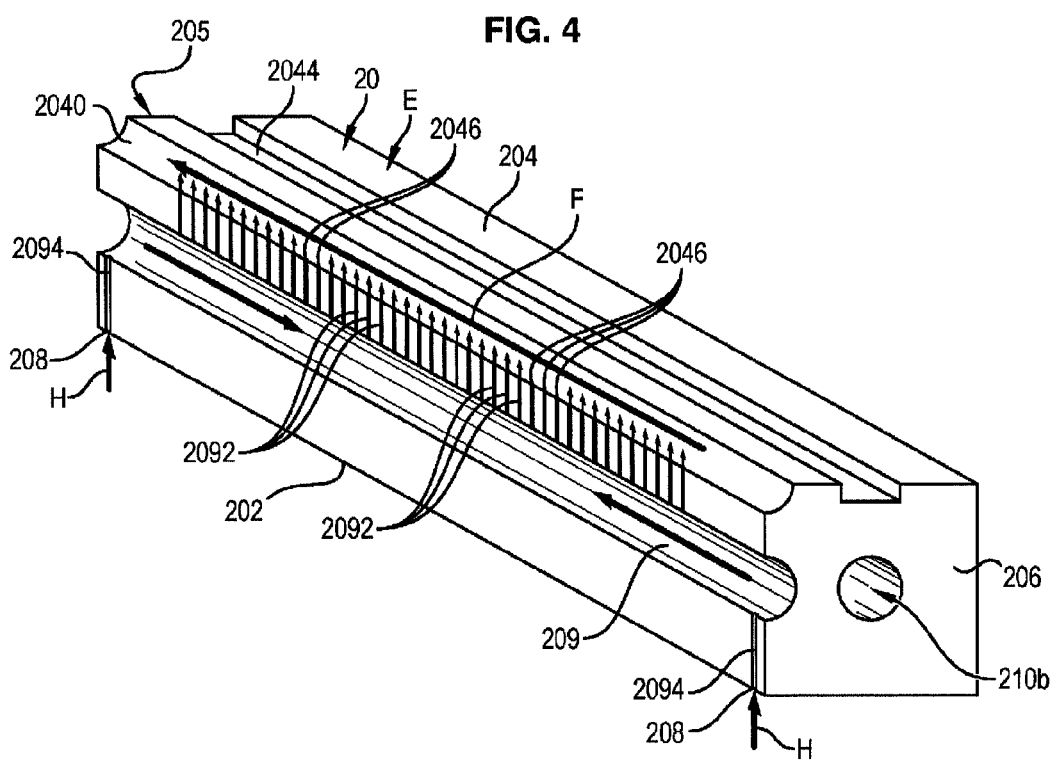
FIG. 4 is a cavalier projection of a cross-section along plane IV-IV of part of an optical fiber cooling device according to one embodiment of the present invention.

With reference to FIGS. 4 and 5, the block E forming the half portion 20 of the device further comprises a secondary channel 209 parallel to the main half-channel 2040, the two being connected by a plurality of passages 2092 each being connected to an opening 2046 of the main half-channel 2040. The secondary channel 209 is positioned so that its main axis merges with the main axis A of the block E. The secondary channel 209 is of cylindrical shape with circular cross-section having a diameter ranging from 6 mm to 20 mm and is preferably 13 mm. The passages 2092 are preferably perpendicular to the axis A and are located in the median plane of the main half-channel 2040.

Block E also comprises at least one inlet 208 for heat-exchange fluid, the inlet 208 being in fluid connection with the secondary channel 209 by a passage 2094 perpendicular to axis A; the inlet 208 is therefore in fluid connection with the plurality of openings 2046. The inlet 208 may be provided with a pneumatic connecting element as illustrated in FIG. 2a. Preferably, block E comprises two inlets 208a and 208b located at the two ends of the secondary channel 209.

Therefore, the secondary channel 209 forms a heat-exchange fluid distribution chamber for the plurality of openings 2046. The fact that the fluid is first injected into the secondary channel 209 forming a distribution chamber means that it is possible for the fluid to be injected in parallel into all the openings 2046. Therefore, the fluid enters into contact with the fiber over the entire length of the main channel, which increases the exchange surface between the fluid and the fiber. The ratio between the diameter of the secondary channel 209 and the diameter of the openings 2046 allows creation of the distribution chamber effect. This ratio is preferably between 3 and 100. The relative sizing of the channel and of the secondary openings therefore allows a distribution chamber to be obtained having uniform and continuous distribution of the helium over the optical fiber, and an identical flow rate at each secondary opening. In addition this is not influenced by the Helium feed rate.

Block E also comprises ducts 210a and 210b parallel to axis A and positioned either side of the secondary channel 209 so that the main axes of the secondary channel 209 and of the ducts 210a and 210b are contained within one same plane, comprising the main axis A and parallel to the receiving surface 204. The ducts 210a and 210b are preferably of same shape and diameter as the secondary channel 209. Even if different vocabulary is used to better distinguish between them, the "channel" and the "duct" refer to a similar technical reality.

The ducts 210a and 210b are used as cooling circuit for block E by means of a heat-exchange fluid passing through it (e.g. cooled water).

Advantageously the two ducts are connected at one of their ends by a channeling element so that the inlet and outlet of the heat-exchange fluid is able to take place on the same surface of block E. As illustrated in FIG. 2a, the ducts 210a and 210b are also provided with a connecting element.

Preferably, block E' of the half-portion 29 comprises a secondary channel and cooling ducts that are symmetrical relative to the plane of contact of the receiving surfaces 204 and 294.

The use of solid blocks to manufacture the device makes it possible to limit deformations due to various stresses in particular heat stresses. Said configuration is particularly advantageous compared with systems designed from a set of plates arranged together to form the fluid circulation channels.

Figure 7:
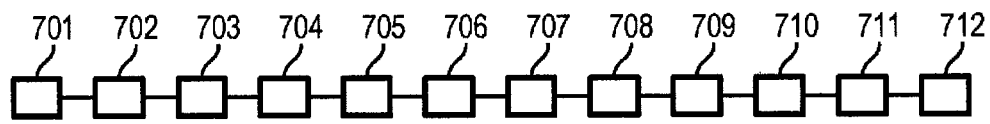
FIG. 7 is a functional graph of a method for manufacturing an optical fiber cooling device according to one embodiment of the present invention.

With reference to FIG. 7, a method for manufacturing a cooling device according to one embodiment of the present invention comprises the following steps:
  a. providing a block E in heat-conductive material, preferably 7075 aluminum, the block having at least one planar surface 204 (step 701);
  b. forming a main half-channel 2040 on the planar surface 204 of block E (step 702) e.g. using a spherical bur;
  c. piercing/boring a secondary channel 209 in block E (step 703);
  d. piercing/boring a plurality of passages 2092 between the secondary channel 209 and the main half-channel 2040 of block E (step 704);
  e. piercing at least one inlet 208 for the inner channel 209 (step 705);
  f. piercing/boring two cooling ducts 210a and 210b in block E (step 706);
  g. forming secondary grooves 2042 and 2044 either side of the main half-channel 2040 on surface 204 (step 707);
  h. hermetically sealing the ends of the secondary channel 209 to form a hermetical fluid circuit between the at least one inlet 208 and the openings 2046 (step 708);
  i. if necessary, arranging connecting elements at the inlet 208 and cooling ducts 210a and 210b (step 709);
  j. arranging an insulating layer on at least one surface of block E other than the receiving surface 204 which receives the half-channel 2040 (step 710);
  k. providing a second block E' and performing at least step b and preferably all steps b to j on block E' (step 711);
  l. contacting the two blocks E and E' via their respective receiving surface 204 and 294 so that the two half-channels (respectively 2040 and 2940) form a main channel of the two assembled blocks E and E' (step 712).

The different channels, ducts and openings formed in the solid blocks are preferably made by boring. With said manufacturing technique, it is possible to form perfectly circular channels having no dissymmetry which would concentrate stresses and could therefore damage the device.

In addition, the boring technique allows a circular channel to be obtained whose inner surface has fewer defects than a channel formed by extrusion. For the secondary channel feeding helium, this characteristic promotes the set-up of a turbulent helium system.

Figure 5A:
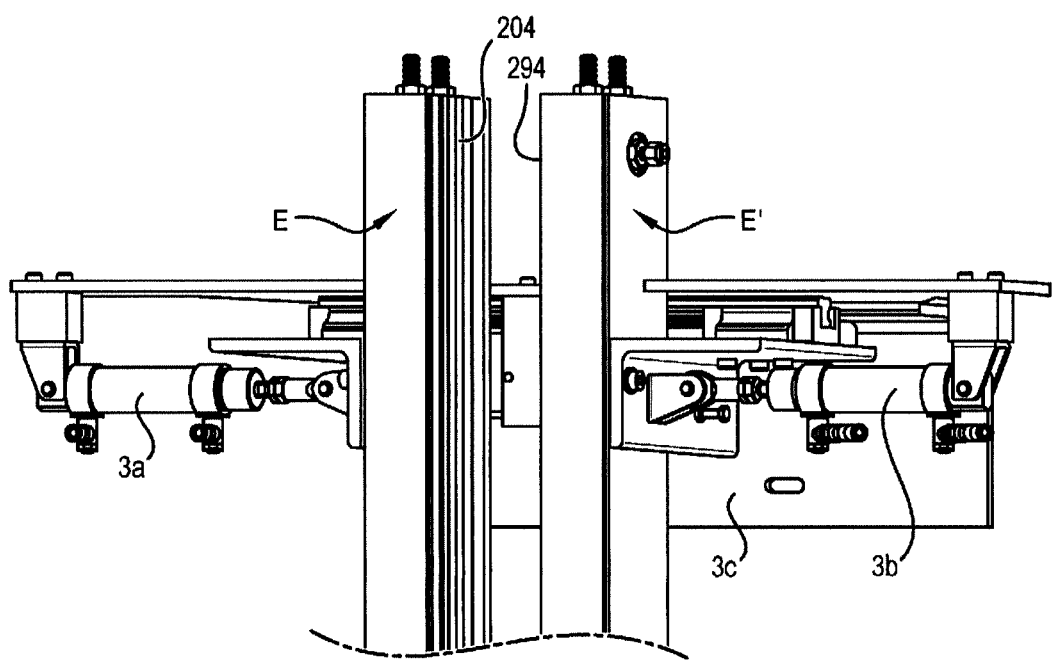
FIGS. 5a and 5b are schematic illustrations of an optical fiber cooling device according to one embodiment of the present invention, in open and closed position respectively.
Figure 5B:
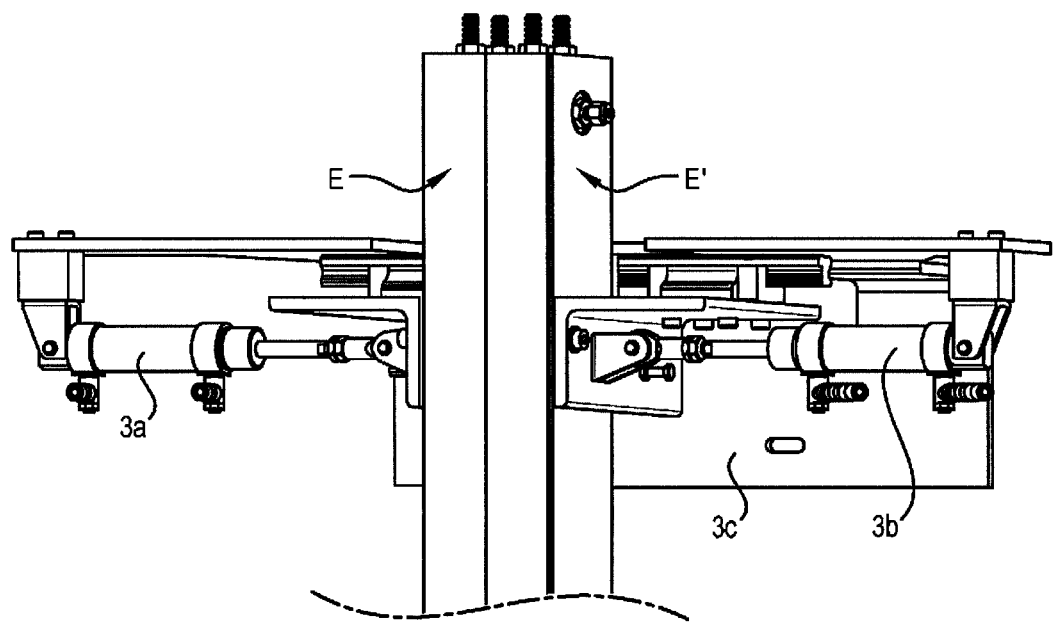

With reference to FIGS. 5a and 5b, the contacting of the blocks E and E' (step 1) is performed in the following manner.

Each block E and E' is arranged with their receiving surface 204 and 294 facing one another, on a cylinder arm, respectively 3a and 3b, the two cylinders being arranged on one same frame 3c such that when the two cylinders 3a and 3b are in the extended position, the two blocks E and E' are placed in contact, by translation, via their respective planar surface 204 and 294, so that the two half-channels (respectively 2040 and 2940) form a main channel of the two assembled blocks E and E'. In the retracted position of the cylinders, the two blocks are separated from each other by translation, the two receiving surfaces 204 and 294 remaining parallel. The receiving surfaces 204 and 294 being smooth, this allows facilitated cleaning of their surface.

Evidently, any other contacting method can be applied, for example by rotating one receiving surface relative to the other or via combined rotation and translation.

Figure 6:
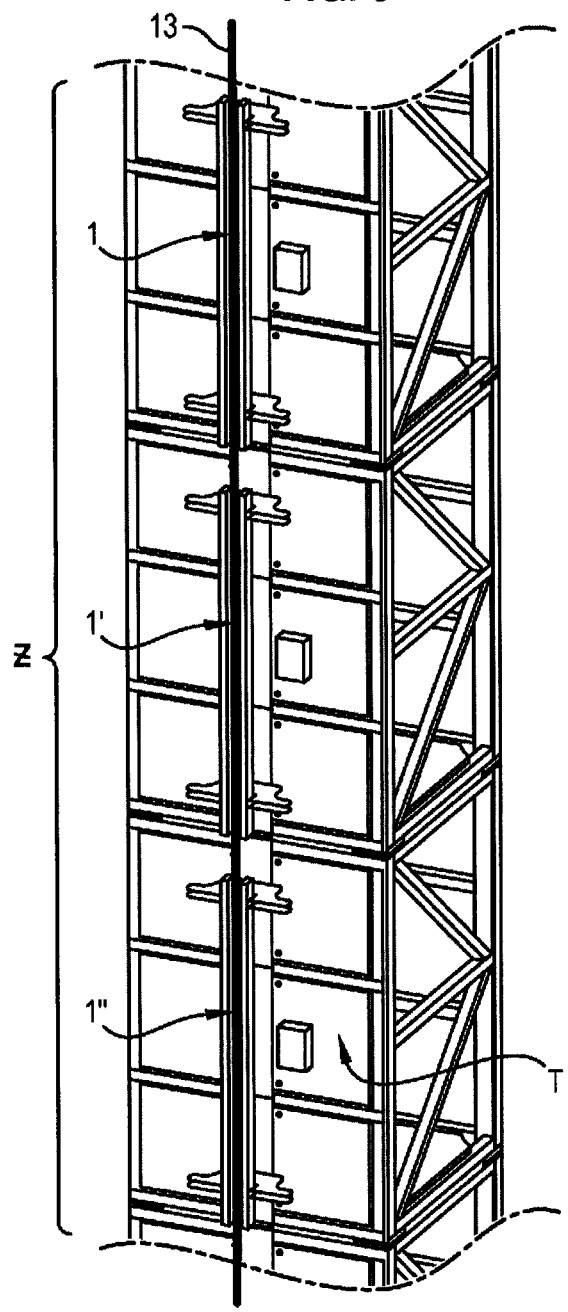
FIG. 6 is a schematic illustration of a tower for fabricating optical fiber according to one embodiment of the present invention.

With reference to FIG. 6, a tower T for fabricating an optical fiber 13 is provided having a cooling zone Z downstream of the furnace (not illustrated) from which the optical fiber emerges, the cooling zone Z comprising three cooling devices for example such as described above, respectively 1, 1' and 1", the optical fiber 13 then circulating in the main channel of each of the devices 1, 1' and 1" to be cooled therein.

With reference again to FIG. 4, when the optical fiber circulates in the main channel in direction of arrow F, helium H (whose pathway is represented by black arrows) is injected via the inlets 208 and is distributed via the secondary channel 209 to all the openings 2049 of the main channel.

Since the openings 2049 are spaced apart along the main channel, the helium H is immediately placed in a turbulent system and enters into heat contact with the optical fiber at several points at the same time. The turbulent helium system, and the fact that it is injected into a plurality of openings at the same time, allows the exchange surface to be increased between the cold helium and the fiber. The fiber is therefore cooled much more efficiently than with known prior art devices.

In addition, the fact that the blocks E and E' are in heat-conductive material and that the main channel is hermetically sealed by the seals 207a and 207b means that it possible to use helium economically as it only escapes through the openings 2049.

The radiation absorption layer of the main channel allows the radiation from the fiber leaving the furnace to be absorbed, in particular if black anodization is used. Additionally, the heat energy collected by the material of blocks E and E' forming the device can be evacuated via the cooling ducts within which a heat-exchange fluid circulates, such as cooled water.

The studies conducted allowed the following data to be obtained:
  Temperature of the optical fiber 13 entering the cooling zone: 1000° C.;
  Temperature of the optical fiber leaving the cooling zone: 35-50° C.;
  Diameter of the fiber: 125 µm;
  Intake temperature of the cooled water: 15-18° C.;
  Number of devices in the cooling zone: 2 to 3;
  Length of a block of a cooling device: 2600 mm to 3000 mm;
  Cooling block in 7075 aluminum, black anodized.

The invention claimed is:

1. A cooling device for optical fiber, comprising two portions, each portion comprising at least one receiving surface on which a half-channel is arranged so that once the two portions are contacted at their receiving surface the two portions form a cylindrical main through-channel intended to receive the passing of the optical fiber, wherein each of the portions is a one-piece block of heat-conductive material and wherein at least one of the portions comprises a cylindrical secondary channel in fluid connection with a plurality of openings distributed along the half-channel of this portion to form a distribution chamber for heat-exchange fluid distributed to the plurality of openings, a main axis of the secondary channel being parallel to a main axis of the main-through channel and not coincident with the main axis of the main-through channel.

2. The device according to claim 1 wherein the secondary channel is connected to the main channel via a plurality of passages, each connected to an opening of the main channel.

3. The device according to claim 2 wherein the ratio between the diameter of the secondary channel and the diameter of the plurality of openings is chosen so that the secondary channel forms a distribution chamber allowing the heat-exchange fluid to be injected in parallel into all the openings.

4. The device according to claim 3 wherein the ratio between the diameter of the secondary channel and the diameter of the plurality of openings is between 3 and 100.

5. The device according to claim 2 wherein the ratio between the diameter of the secondary channel and the diameter of the plurality of openings is between 3 and 100.

6. The device according to claim 1 comprising an inlet for heat-exchange fluid in fluid connection with the secondary channel.

7. The device according to claim 1 wherein the heat-conductive material comprises aluminum.

8. The device according to claim 1 further comprising a cooling duct of the device.

9. The device according to claim 1 wherein the openings are spaced apart by a distance ranging from 5 mm to 200 mm.

10. The device according to claim 1 comprising at least one seal allowing the perimeter of the main channel to be hermetically sealed.

11. The device according to claim 1 wherein the main channel is coated with a radiation absorption layer.

12. The device according to claim 1 wherein the block forming the other of the portions also comprises a secondary channel and cooling ducts that are symmetrical relative the plane of contact of the receiving surfaces.

* * * * *